Dec. 16, 1924.   1,519,935
M. E. RUTHERFORD
SUPPORT FOR THE CROSS BRACES OF MOTOR VEHICLES
Filed July 9, 1923
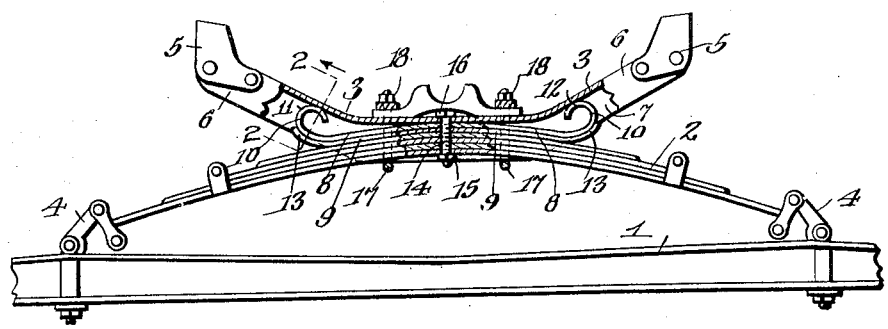
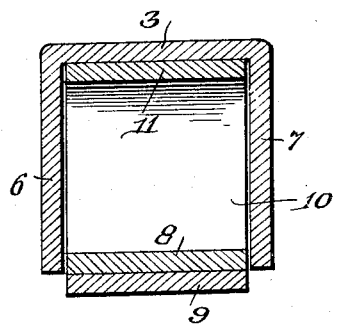
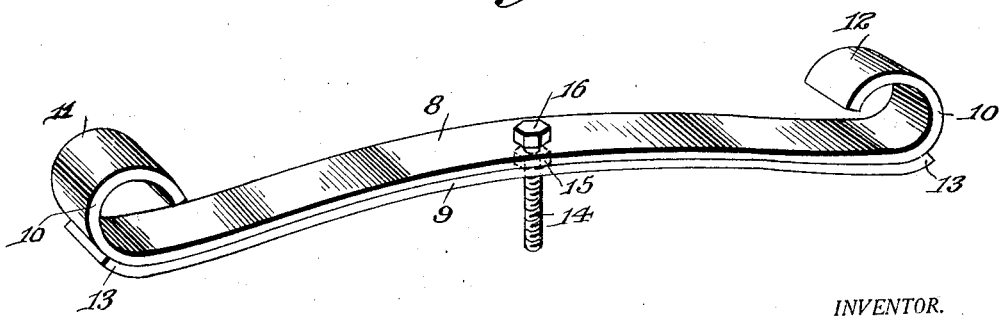
INVENTOR.
Marvin E. Rutherford,
BY
Geo. P. Kimmel
ATTORNEY.

Patented Dec. 16, 1924.

1,519,935

UNITED STATES PATENT OFFICE.

MARVIN E. RUTHERFORD, OF ABILENE, TEXAS, ASSIGNOR TO ABILENE MANUFACTURING COMPANY, OF ABILENE, TEXAS, A CORPORATION OF TEXAS.

SUPPORT FOR THE CROSS BRACES OF MOTOR VEHICLES.

Application filed July 9, 1923. Serial No. 650,455.

*To all whom it may concern:*

Be it known that I, MARVIN E. RUTHERFORD, a citizen of the United States, residing at Abilene, in the county of Taylor and State of Texas, have invented certain new and useful Improvements in Supports for the Cross Braces of Motor Vehicles, of which the following is a specification.

This invention relates to a support for the cross braces of motor vehicles, and is designed primarily for use in connection with the front cross braces or members of Ford cars, but it is to be understood that a support in accordance with this invention can be employed for any purposes wherein it is found applicable, and the invention has for its object to provide in a manner as hereinafter set forth a yieldable support interposed between the front cross brace and front vehicle spring of a motor vehicle and having its ends so constructed and arranged, whereby when a car is loaded or when a car is travelling over an uneven road surface to act in a manner to sustain the weight of the load from the ends thereof, thereby relieving the tie bolt connection between the vehicle spring, support and cross brace from the weight of the load.

A further object of the invention is to provide in a manner as hereinafter set forth, a yieldable support disposed in a manner and for the purpose referred to and of a length as to prevent any interference with any of the parts of a car, such as bumpers, shock absorbers, etc.

A further object of the invention is to provide in a manner as hereinafter set forth a yieldable cross brace support so set up with respect to the cross brace as to prevent the vehicle spring from slipping and further to prevent breaking the tie bolt connection between the vehicle spring, support and cross brace.

A further object of the invention is to provide in a manner as hereinafter set forth a yieldable support interposed between the cross brace and the vehicle spring and comprising an upper member for protecting the cross brace and a lower member for protecting the spring.

A further object of the invention is to provide in a manner as hereinafter set forth, a yieldable support interposed between the cross brace and the vehicle spring, as well as extended into the cross brace and provided with a pair of bearing surfaces coacting with the cross brace to balance the car and to set up said bearing surfaces in such a manner as to reduce wear on the cross brace to a minimum.

Further objects of the invention are to provide a support for the purpose set forth which is simple in its construction and arrangement, strong, durable, compact, efficient and convenient in its use, readily set up with respect to the cross brace and vehicle spring, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a front elevation of a front cross brace and a front vehicle spring showing the adaptation thereto of a yieldable support in accordance with this invention, the brace, spring, and support being shown partly in section.

Fig. 2 is a section on line 2—2 of Fig. 1.

Fig. 3 is a perspective view of the yieldable support in accordance with this invention.

Referring to the drawings in detail, 1 denotes the front axle body of a motor vehicle, 2 the front vehicle spring and 3 a front cross brace, and interposed between the spring 2 and cross brace 3 is a yieldable support in accordance with this invention and which will be hereinafter referred to.

The vehicle spring 2, is connected with the axle body 1, by the pivotal connection 4. The cross brace 3 is of inverted channel-shape and comprises an intermediate portion which is straight, and a pair of upwardly and outwardly inclined end portions and each of the latter is provided with a coupling element for connecting it with the vehicle body and the said coupling elements being indicated at 5.

The vehicle spring 2 is of the laminated type, and when a yieldable support is interposed between the spring 2 and the cross brace 3, the upper leaf of the spring 2 is removed and one of the elements of the yieldable support acts as a substitute for the leaf which has been removed.

By reference to Fig. 2 of the drawings, the cross brace 3 is shown in section, and it is formed of a top portion, and a pair of side portions 6, 7.

A yieldable support in accordance with this invention comprises an upper resilient member 8 and a lower resilient member 9. Each of the members 8, 9, is constructed of a length of spring metal and is of a width corresponding to the width of any one of the leaves of the spring 2, and also of a width so that the member 8 can extend into the cross brace 3. The members 8, 9, are arranged in abutting engagement and the former is of greater length than the latter.

The member 8 has each end terminal thereof bent upon itself in a curvilinear manner, as at 10, thereby providing a pair of bearing surfaces 11, 12. The bearing surfaces, abut against the inner face of the top of the cross brace 3. The end terminal portions of the member 9 are curved upwardly and bear against the curved portions 10 of the member 5. The upwardly curved end portions of the member 9 are indicated at 13. The members 8 and 9 for the major portion of their length are segment shaped in contour and conform in contour to the shape of the leaves of the spring 2.

The member 9 is employed to protect the spring 2, as well as to provide resilient bearings 13 for the inturned curved terminal portions 10 of the member 8 and is substituted for the upper leaf of the spring 2 which has been removed. The member 8 is not only employed for balancing the vehicle, but also as a protecting means for the cross brace 3.

Extended up through the spring 2, members 8, 9, and also through the top of the cross brace 3, is a tie bolt 14, having a securing nut 15 mounted on the lower end thereof.

The head of the bolt 14 is indicated at 16 and bears against the outer face of the top of the cross brace 3. By this arrangement the spring 2, as well as the yieldable support, is connected with the cross brace 3, and as the latter overlaps or encloses the support, as well as a portion of the spring 2, sidewise movement of the yieldable support and spring 2 with respect to the cross brace 3 is prevented, under such conditions preventing or rather reducing possibility of breaking of the tie bolt 14 to a minimum. The spring 2, yieldable support and cross brace 3 are connected together by a plurality of securing yokes 17 which overlap the spring 2. Hold fast devices 18 are mounted on the securing yokes to maintain them in position.

The overlapping curved terminals of the member 8 provide means for supporting the cross brace 3 and also means for sustaining the load, so that the tie bolt connections will be relieved therefrom, and further set up a cushioning function when the vehicle is travelling over an uneven road surface. The setting up of the support in the manner as shown, with respect to the cross brace 3, prevents the spring 2 from slipping to break the tie bolt 14.

The preferred construction of the yieldable support is as described and illustrated, but it is to be understood that changes in the details of construction can be had without departing from the spirit of the invention as claimed.

What I claim is:—

1. A yieldable support for the purpose set forth comprising an upper resilient member having each of the end terminals thereof bent upwardly and inwardly in a curvilinear manner upon itself to form a curved bearing surface for a vehicle cross brace, and a lower member of less length than and abutting against said upper member and having its end terminal portions upwardly curved to permanently bear against the lower part of the bent end terminal portions of the other member and constitute resilient bearings therefor.

2. A yieldable support for the purpose set forth comprising an upper resilient member having each of the end terminals thereof bent upwardly and inwardly in a curvilinear manner upon itself to form a curved bearing surface for a vehicle cross brace, and a lower member of less length than and abutting against said upper member and having its end terminal portions upwardly curved to permanently bear against the lower part of the bent end terminal portions of the other member and constitute resilient bearings therefor, and means extending through said members for connecting them to a cross brace and a sustaining spring of a motor vehicle.

3. A yieldable support for the purpose set forth comprising an upper resilient member having each of the end terminals thereof bent upwardly and inwardly in a curvilinear manner upon itself to form a curved bearing surface for a vehicle cross brace, and a lower member of less length than and abutting against said upper member and having its end terminal portions upwardly curved to permanently bear against the lower part of the bent end terminal portions of the other member and constituting resilient bearings therefor, and means extending through said members centrally thereof for connecting them to the cross brace and a sustaining spring of a motor vehicle.

4. In combination, a motor vehicle cross brace of inverted channel form, a support formed of a pair of superposed abutting members having the intermediate portions thereof extended into said brace, said members having permanently abutting curved end terminals, the curved end terminals of the upper member abutting against the inner face of said brace at the top thereof, and the curved end terminal portions of the lower member providing resilient bearings for the curved end terminal portions of the upper member, and means extending through said support and said cross brace for connecting them together and to a vehicle sustaining spring.

5. In combination, a motor vehicle cross brace of inverted channel form, a support formed of a pair of superposed abutting members having the intermediate portions thereof extended upwardly into said brace, the upper of said members having curved end terminals abutting against the inner face of said brace at the top thereof, said lower member having curved end terminal portions constituting resilient bearings for the curved terminals of the upper member and means extending through said support and said cross brace for connecting them together and to a vehicle sustaining spring, said means disposed centrally with respect to said support and said brace.

6. In combination, a motor vehicle cross brace of inverted channel form, a support formed of a pair of superposed abutting members having the intermediate portions thereof extended into said brace, the upper of said members having curved end terminals abutting against the inner face of said brace at the top thereof, said lower member having end terminal portions constituting resilient bearings for the curved terminals of the upper member and means extending through said support and said brace for connecting them together, and to a vehicle sustaining spring, the lower of said members having upwardly extending curved end portions permanently bearing against a part of the curved end portions of the upper of said members.

In testimony whereof, I affix my signature hereto.

MARVIN E. RUTHERFORD.